(12) United States Patent
Aichinger et al.

(10) Patent No.: US 10,155,996 B2
(45) Date of Patent: Dec. 18, 2018

(54) METHOD AND DEVICE FOR MANUFACTURING GRANULATES

(71) Applicant: PRIMETALS TECHNOLOGIES AUSTRIA GMBH, Linz (AT)

(72) Inventors: Christoph Aichinger, Ottensheim (AT); Stefan Hoetzinger, Wels (AT); Karl Laaber, Dietach (AT); Johann Reidetschlaeger, Linz (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 269 days.

(21) Appl. No.: 15/021,301

(22) PCT Filed: Jul. 7, 2014

(86) PCT No.: PCT/EP2014/064431
§ 371 (c)(1),
(2) Date: Mar. 11, 2016

(87) PCT Pub. No.: WO2015/036139
PCT Pub. Date: Mar. 19, 2015

(65) Prior Publication Data
US 2016/0222478 A1    Aug. 4, 2016

(30) Foreign Application Priority Data

Sep. 11, 2013 (EP) ..................................... 13183890

(51) Int. Cl.
*B01J 2/12* (2006.01)
*C22B 1/14* (2006.01)
(Continued)

(52) U.S. Cl.
CPC ............... *C21B 5/008* (2013.01); *B01J 2/003* (2013.01); *B01J 2/10* (2013.01); *B01J 2/12* (2013.01); *C22B 1/16* (2013.01); *Y02P 10/216* (2015.11)

(58) Field of Classification Search
CPC ..................................... B01J 2/12; C22B 1/14
(Continued)

(56) References Cited

U.S. PATENT DOCUMENTS 3,406,426 A * 10/1968 Pobst, Jr. ................... B01J 2/10
264/117
6,287,363 B1 * 9/2001 Grunbacher ............ B01F 7/048
266/142
(Continued)

FOREIGN PATENT DOCUMENTS

AU    2009271984 B2    1/2010
CN       1516744 A     7/2004
(Continued)

OTHER PUBLICATIONS

Office Action dated Oct. 19, 2016 issued in corresponding Chinese Patent Application No. 201480050240.0 with English translation.
(Continued)

*Primary Examiner* — Robert B Davis
(74) *Attorney, Agent, or Firm* — Ostrolenk Faber LLP

(57) ABSTRACT

A method and a device for producing granulates (1) which are obtained by the method steps: intensively mixing raw materials (2) and optionally additives (6) by adding water (3) to form a mixture (4); introducing the mixture (4) and optional additives (6) into a granulator (11); granulating the mixture (4) by adding water (3) to form raw granulates (12); introducing the raw granulates (12), water (3) and optional additives (6) into a rolling drum (17) and rolling the raw granulates (12) to form the granulates (1).

7 Claims, 1 Drawing Sheet

(51) Int. Cl.
*C21B 5/00* (2006.01)
*B01J 2/00* (2006.01)
*B01J 2/10* (2006.01)
*C22B 1/16* (2006.01)

(58) Field of Classification Search
USPC .......................................................... 425/222
See application file for complete search history.

(56) References Cited

U.S. PATENT DOCUMENTS

| | | | |
|---|---|---|---|
| 8,118,582 B1* | 2/2012 | Ileleji ........................ | B01F 7/02 |
| | | | 425/197 |
| 9,175,363 B2 | 11/2015 | Gunther et al. | |
| 2004/0154436 A1 | 8/2004 | Ito et al. | |
| 2007/0166420 A1 | 7/2007 | Pammer ........................ | 425/130 |
| 2012/0186395 A1 | 7/2012 | Harada et al. .................. | 75/392 |

FOREIGN PATENT DOCUMENTS

| CN | 1675384 A | 9/2005 |
|---|---|---|
| CN | 1696318 A | 11/2005 |
| CN | 102459658 A | 5/2012 |
| CN | 102482729 A | 5/2012 |
| CN | 102510906 A | 6/2012 |
| CN | 103038368 A | 4/2013 |
| CN | 103154280 A | 6/2013 |
| EP | 0786288 B1 | 5/2002 |
| EP | 1 541 700 A1 | 6/2005 |
| JP | H 7-97639 A | 4/1995 |
| JP | 2003-113425 A | 4/2003 |
| JP | 2003-129139 A | 5/2003 |
| JP | 2004-76130 A | 3/2004 |
| JP | 2005-133209 A | 5/2005 |
| JP | 2007-169707 A | 7/2007 |
| JP | 2007-191770 A | 8/2007 |
| JP | 2009242939 A | 10/2009 |
| JP | 2010043354 A | 2/2010 |
| JP | 2012097295 A | 5/2012 |
| JP | 2013-36051 A | 2/2013 |
| SU | 466041 A1 | 4/1975 |
| SU | 1504274 A1 | 8/1989 |
| SU | 1648928 A1 | 5/1991 |
| TW | 533237 B | 5/2003 |
| UA | 86222 C2 | 4/2009 |

OTHER PUBLICATIONS

International Search Report dated Feb. 5, 2015 issued in corresponding International patent application No. PCT/EP2014/064431.
International Preliminary Report on Patentability dated Dec. 15, 2015 issued in corresponding International Preliminary Report on Patentability.
Notification for the Opinion of Examination Intellectual Property Office Ministry of Economic Affairs with Search Report dated Oct. 31, 2017 in corresponding Taiwanese Patent Application No. 103128543 (total 6 pages).
Notice of Reasons for Rejection dated Oct. 30, 2017 in corresponding Japanese Patent Application No. 2016-541850 (total 7 pages).
Office Action with Search Report dated Apr. 28, 2018 in corresponding Russian Federation Patent Application No. 2016113293/02(020806).
Ukraine Office Action, dated Jul. 9, 2018, issued in corresponding Ukrainian Patent Application No. a 2016 02309. Total 3 pages.

* cited by examiner

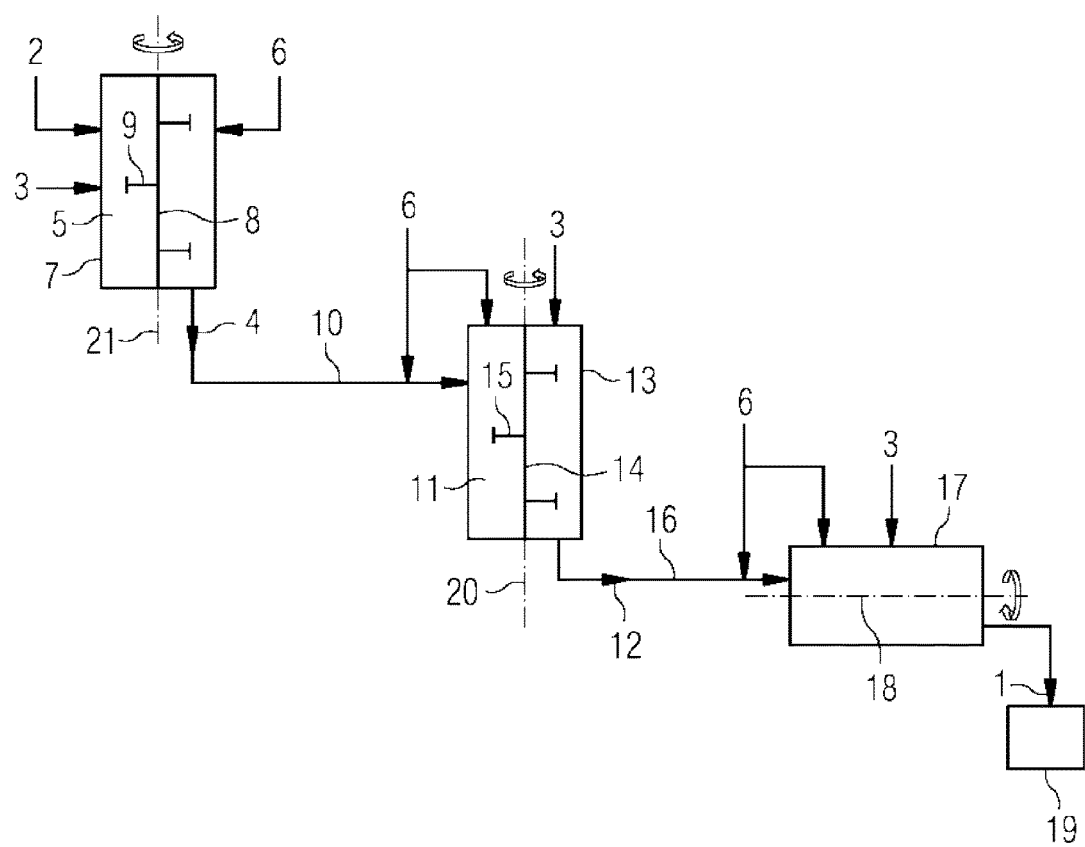

METHOD AND DEVICE FOR MANUFACTURING GRANULATES

CROSS-REFERENCE TO RELATED APPLICATIONS

The present application is a 35 U.S.C. §§ 371 national phase conversion of PCT/EP2014/064431, filed Jul. 7, 2014, which claims priority of European Patent Application No. 13183890.6, filed Sep. 11, 2013, the contents of which are incorporated by reference herein. The PCT International Application was published in the German language.

TECHNICAL FIELD

The invention relates to a method for manufacturing granulates, wherein the manufacture of the granulates comprises mixing raw materials, in particular iron ore, fine iron ore concentrates, coke breeze, limestone and if applicable admixtures, while adding water, to produce a mixture in an intensive mixer, and the granulation and rolling of the mixture in a granulator and a rolling drum respectively.

The invention further relates to a device for performing the method according to the invention.

PRIOR ART

According to the prior art, ferriferous feed materials are introduced into metallurgical processing units, e.g. blast furnaces, in order to smelt liquid pig iron therefrom. One known feed material is sinter. Sinter is manufactured in a sintering plant, e.g. as a result of the combustion of a raw sintering mixture containing iron ores, recirculating materials and fuel. For this purpose, the raw sintering mixture arrives as a layer on a blast roasting or sintering belt and is introduced into the sintering plant. The layer is ignited in the sintering plant, whereupon a flame front forms. The flame front is pushed forwards by means of a gas, e.g. air, which is blown or sucked through the layer and passes through the whole layer. This produces burned sinter or so-called sinter cakes, which are then introduced as feed material into the metallurgical processing unit after crushing and classification if appropriate. In order to ensure an efficient sintering process and optimal formation of the flame front, a certain minimal permeability of the layer is required. This means that the layer on the blast roasting or sintering belt must not fall below a certain gas permeability. The permeability correlates to the proportion of coarse-grained material in the layer. The greater the proportion of coarse-grained material, the higher the permeability and vice versa. In addition, the permeability is also influenced by the geometric shape of the material contained in the raw sintering mixture. One known measure for ensuring the minimal permeability of the layer is the introduction of the layer into the sintering plant in the form of granulates having a specific size, a specific geometric shape and a specific composition.

The trend in the mining industry is increasingly towards raw materials in the form of fine particles, such as e.g. fine iron ore concentrates, which have a grain size of less than 200 μm. The use of other raw materials in the form of fine particles, such as e.g. steelworking dust or admixtures, is also desirable.

The mixing and granulation of such raw materials in the form of fine particles is associated with considerable difficulties when using methods that are known from the prior art, since the raw materials in the form of fine particles can only be incorporated into the granulates to a limited extent. A significant proportion of these raw materials in the form of fine particles remains behind as fine particles when the known methods are applied. Moreover, granulates manufactured in accordance with the prior art often have different grain sizes and/or a geometric shape which is unsuitable for the sintering process.

Introduction of such granulates as a layer into a sintering plant has negative effects on the permeability of the layer and therefore on the productivity of the sintering plant.

SUMMARY OF THE INVENTION

Technical Problem

The object of the present invention is to provide a method for manufacturing granulates, which overcome the disadvantages known from the prior art. A further object of the invention is to provide a device for performing the method according to the invention.

Technical Solution

This object is achieved by a method for manufacturing granulates, wherein the manufacture of the granulates comprises method steps as follows:
in a first method step, intensively mixing raw materials, in particular iron ore, fine iron ore concentrates, coke breeze, limestone and, if applicable, optional admixtures, in particular sinter returns, binding agents, dust and/or residual steelworking materials, while adding water, to produce a mixture in an intensive mixer,
in a second method step, introducing the mixture and if applicable optional admixtures into a granulator and granulating the mixture and if applicable the optional admixtures, while adding water, to produce raw granulates,
in a third method step, introducing the raw granulates, water, and if applicable optional admixtures and/or coke fines, into a rolling drum and roll the raw granulates and if applicable, coating the raw granulates with calcium oxide and/or calcium hydroxide and/or the coke fines—to produce the granulates.

In the first method step, the raw materials, in particular iron ore, fine iron ore concentrates, coke breeze, limestone and if applicable the admixtures, in particular sinter returns, binding agents, dust and residual steelworking materials, are mixed in the intensive mixer. The admixtures may also include dolomite, olivine and serpentine. Binding agents may include e.g. calcium oxide and/or calcium hydroxide. Intensive mixing of the raw materials in the intensive mixer initially results in a breakdown and disintegration of any agglomerates of raw materials that may be present. Homogenization and particularly uniform intermixing of the raw materials is also effected in this way. The resulting mixture may also contain first microgranulates, i.e. smallest pellets of the raw materials, in which a plurality of smaller raw material particles adhere to individual larger raw material particles.

The addition of water results in optimal water distribution in the mixture as preparation for the subsequent method steps.

Iron ore is understood to be iron oxide-bearing material having a maximal grain size of 10 mm. Fine iron ore concentrates is understood to be iron oxide-bearing material having a maximal grain size of 200 μm. The fine iron ore concentrates also comprises in particular iron oxide-bearing pellet feed having a maximal grain size maximal of 45 μm.

Sinter returns are understood to be undersize and/or oversize particles of an iron oxide-bearing material, which accumulate during classification of the iron oxide-bearing material. The grain size of the sinter returns is between 3 mm and 8 mm, preferably between 3 mm and 5 mm. The maximal grain size of the limestone, like the grain size of the coke breeze, is 5 mm, preferably 3 mm. The maximal grain size of the binding agent, preferably calcium oxide or calcium hydroxide, is 3 mm, preferably 1 mm. The maximal grain size of the dust is 1 mm while the maximal grain size of the residual steelworking materials is 8 mm.

Residual steelworking materials are understood to be ferriferous residual materials from a steelworks. Dust is understood to be ferriferous dust preferably accumulating in an integrated iron and steelworks, e.g. dust from a sintering plant, a blast furnace or a rolling mill, or ferriferous dust from corresponding dust collecting apparatus assigned thereto.

In the second method step, the mixture is introduced into the granulator, together with at least one of the above-cited admixtures if applicable. The granulation of the mixture, together with at least one of the admixtures if applicable, then takes place, while adding water, to produce the raw granulates. During the granulation, smaller particles of the mixture adhere to already existing larger particles, i.e. the microgranulates possibly already produced by virtue of the intensive mixing, thereby forming ever larger raw granulates. The moisture content of the mixture is adjusted and optimized for the granulation by means of adding water.

In the third method step, the raw granulates manufactured thus are introduced into the rolling drum, together with at least one of the above-cited admixtures if applicable. The rolling of the raw granulates takes place in the rolling drum while adding water. In addition, the raw granulates are optionally coated with calcium oxide and/or calcium hydroxide and/or the coke fines in the rolling drum to produce the granulates. For this purpose, the calcium oxide and/or the calcium hydroxide and/or the coke fines are admixed with the raw granulates in the rolling drum and/or before introduction into the rolling drum.

Rolling is understood to mean a rounding off and smoothing of the surface of the raw granulates as a result of the raw granulates rubbing against each other. To this end, the raw granulates in the rolling drum are made to rotate, at least partly, about the respective axis.

As a result of the rolling of the raw granulates, the surface of the granulates is smoothed and shaped to produce an almost perfect sphere. As a result of the coating, both a precisely defined grain size of the raw granulates and a precisely defined chemical composition of the surface layer of the raw granulates are selected.

The granulates according to the invention are preferably used in a sintering plant. In this case, the granulates are introduced into the sintering plant as a raw sintering mixture in the form of a layer. In comparison with granulates manufactured according to the prior art, the layer consisting of the granulates according to the invention has a more homogenous grain size distribution and therefore higher permeability. As a consequence, the productivity of the sintering process is increased, thereby allowing various components of the sintering plant to be scaled down. In contrast with the prior art, the method according to the invention also allows the efficient processing of raw materials in the form of fine particles, including in particular raw materials having a maximal grain size of 200 μm. The addition of fuel (e.g. coke) or the addition of binding agents (e.g. calcium oxide or calcium hydroxide) can also be reduced during the sintering process, since these substances are already uniformly distributed in the granulates manufactured according to the invention, or present in the surface layer thereof.

In a preferred embodiment of the method according to the invention, the intensive mixing of the mixture in the intensive mixer is performed for at least 30 seconds, preferably at least 40 seconds, and for a maximum of 90 seconds, preferably a maximum of 60 seconds.

By virtue of the intensive mixer having a high driving power, i.e. preferably between 1 kilowatt per 100 cubic decimeters of mixture and 10 kilowatts per 100 cubic decimeters of mixture, optimal intermixing is already performed in a much shorter time in comparison with retention times of 3 to 4 minutes known from the prior art. Furthermore, the high driving power of the intensive mixer ensures optimal intermixing and homogenization of the mixture.

A further preferred embodiment of the method according to the invention is characterized in that the granulation of the mixture in the granulator is performed for at least 50 seconds, preferably at least 60 seconds, and for a maximum of 120 seconds, preferably a maximum of 90 seconds.

In comparison with the retention times of approximately 4 minutes known from the prior art, the granulation according to the invention of the mixture to produce the raw granulates is already performed in a much shorter time.

In a further preferred embodiment of the method according to the invention, the water content of the mixture has a lower limit of 3 percent by mass, preferably 4 percent by mass, and an upper limit of 9 percent by mass, preferably 8 percent by mass, relative to the total mass of the mixture.

This ensures that the mixture has an optimal water content for the granulation in the granulator and for the rolling and/or coating in the rolling drum.

The invention further relates to a device for performing the method according to the invention, said device comprising:
- an intensive mixer for intensively mixing raw materials, in particular iron ore, fine iron ore concentrates, coke breeze, limestone, and if applicable admixtures, in particular sinter returns, binding agents, dust and/or residual steelworking materials, while adding water, to produce a mixture,
- a granulator, which is operationally connected to the intensive mixer, for granulating the mixture and if applicable admixtures, while adding water, to produce raw granulates,
- a rolling drum, which is operationally connected to the granulator, for rolling the raw granulates—and if applicable coating the raw granulates with calcium oxide and/or calcium hydroxide and/or coke fines—to produce granulates.

The intensive mixer is characterized in that it has a driving power of preferably between 1 kilowatt per 100 cubic decimeters of mixture and 10 kilowatts per 100 cubic decimeters of mixture. On its input side, the granulator is operationally connected to the intensive mixer. Operationally connected means here that the intensive mixer and the granulator are interconnected in such a way that the mixture produced in the intensive mixer can be introduced into the granulator from the intensive mixer. This is effected by means of a first conveyor belt or a first chute, for example. On its output side, the granulator is operationally connected to the rolling drum. Operationally connected means here that the granulator and the rolling drum are interconnected in such a way that the raw granulates produced in the granulator can be introduced into the rolling drum from the granulator. This is effected by means of a second conveyor belt or a second chute, for example.

In a specific variant of the device according to the invention, the intensive mixer is connected to the granulator by means of two or more conveyor belts and/or the granulator is connected to the rolling drum by means of two or more conveyor belts.

The granulates according to the invention are preferably used in a sintering plant. In this case, the granulates are introduced into the sintering plant as a raw sintering mixture in the form of a layer. In comparison with granulates manufactured according to the prior art, the layer consisting of the granulates according to the invention has a higher permeability. As a consequence, the productivity of the sintering process is increased, thereby allowing various components of the sintering plant to be scaled down. In contrast with the prior art, the device according to the invention also allows the efficient processing of raw materials in the form of fine particles.

In a preferred embodiment of the device according to the invention, the intensive mixer comprises:
  a mixing drum having a mixing drum axis and at least one rotatable mixing drum shaft,
  mixing tools which are fixed to the mixing drum shaft and are so oriented as to be perpendicular to the mixing drum axis or the mixing drum shaft, said mixing drum axis and mixing drum shaft being vertically or horizontally oriented in the normal operating state of the intensive mixer.

If the mixing drum axis and the mixing drum shaft are vertically oriented, the mixing drum can rotate about the mixing drum axis. If the mixing drum axis and the mixing drum shaft are horizontally oriented, the mixing drum cannot rotate about the mixing drum axis.

Intensive mixing of the raw materials in the intensive mixer initially results in a breakdown and disintegration of any agglomerates of raw materials that may be present. Homogenization and particularly uniform intermixing of the raw materials is also effected in this way.

In a further preferred embodiment of the device according to the invention, the granulator comprises:
  a granulator drum having a granulator drum axis and at least one rotatable granulator drum shaft,
  granulating tools which are fixed to the granulator drum shaft and are so oriented as to be perpendicular to the granulator drum axis or the granulator drum shaft, said granulator drum axis and granulator drum shaft being vertically or horizontally oriented in the normal operating state of the granulator.

If the granulator drum axis and the granulator drum shaft are vertically oriented, the granulator drum can rotate about the granulator drum axis. If the granulator drum axis and the granulator drum shaft are horizontally oriented, the granulator drum cannot rotate about the granulator drum axis.

In a further preferred embodiment of the device according to the invention, the rolling drum can rotate about a rolling drum axis, said rolling drum axis being horizontally oriented in the normal operating state of the rolling drum.

In a further embodiment of the device according to the invention, the tool Froude number of the intensive mixer is at least 7, preferably at least 9, and the tool Froude number of the granulator is at least 1, preferably at least 5.

The tool Froude number allows a movement of bulk material to be characterized in a highly simplified manner. It is derived from the ratio of centripetal acceleration to acceleration due to gravity.

The granules manufactured by means of the method according to the invention are preferably used in a sintering plant.

BRIEF DESCRIPTION OF THE DRAWINGS

FIG. 1 schematically shows an exemplary illustration of a method according to the invention and a device according to the invention.

DESCRIPTION OF THE EMBODIMENT VARIANTS

FIG. 1 shows an illustration of a method according to the invention and a device according to the invention for manufacturing granulates 1. In a first method step, provision is initially made for intensively mixing raw materials 2, in particular iron ore, fine iron ore concentrates, coke breeze, limestone and if applicable admixtures 6, in particular sinter returns, binding agents, dust and/or residual steelworking materials, while adding water 3, to produce a mixture 4 in an intensive mixer 5. The water content of the mixture 4 has a lower limit of 3 percent by mass, preferably 4 percent by mass and an upper limit of 9 percent by mass, preferably 8 percent by mass, relative to the total mass of the mixture 4.

The intensive mixer 5 has a mixing drum 7 with a mixing drum axis 21, this being broken marked in FIG. 1, and at least one rotatable mixing drum shaft 8. Mixing tools 9 are fixed to the mixing drum shaft 8 and are so oriented as to be perpendicular to the mixing drum axis 21 or the mixing drum shaft 8, the mixing drum axis 21 and the mixing drum shaft 8 being vertically oriented in the embodiment illustrated in FIG. 1. The mixing drum 7 can rotate about the mixing drum axis 21. Intensive mixing of the raw materials 2 in the intensive mixer 5 initially results in a breakdown and disintegration of any agglomerates of raw materials that may be present. Homogenization and particularly uniform intermixing of the raw materials 2 and/or the admixtures 6 is also effected in this way. The resulting mixture 4 may also contain first microgranulates, i.e. smallest pellets of the raw materials 2, in which a plurality of smaller raw material particles adhere to individual larger raw material particles. The intensive mixing of the mixture 4 in the intensive mixer 5 is performed for at least 30 seconds, preferably at least 40 seconds, and for a maximum of 90 seconds, preferably a maximum of 60 seconds. The intensive mixer 5 has a tool Froude number of at least 7, preferably at least 9.

A first conveyor belt 10 is used to introduce the mixture 4, if applicable together with at least one of the above-cited admixtures 6, into a granulator 11. Granulation of the mixture 4 takes place in the granulator 11, while adding water, to produce raw granulates 12. The moisture content of the mixture 4 is adjusted and optimized for the granulation by means of adding water 3. The granulator 11 has a granulator drum 13 with a granulator drum axis 20, this being broken marked in FIG. 1, and at least one rotatable granulator drum shaft 14. Granulating tools 15 are fixed to the granulator drum shaft 14 and are so oriented as to be perpendicular to the granulator drum axis 20 or the granulator drum shaft 14, the granulator drum axis 20 and the granulator drum shaft 14 being vertically oriented in the embodiment illustrated in FIG. 1. The granulator drum 13 can rotate about the granulator drum axis 20. The granulation of the mixture 4 in the granulator 11 is performed for at least 50 seconds, preferably at least 60 seconds, and for a maximum of 120 seconds, preferably a maximum of 90 seconds. The granulator 11 has a tool Froude number of at least 1, preferably at least 5.

A second conveyor belt 16 is used to introduce the raw granulates 12, if applicable together with at least one of the above-cited admixtures 6 and coke fines, into a rolling drum 17. Rolling and if applicable coating of the raw granulates 12 with calcium oxide and/or calcium hydroxide and/or the coke fines takes place in the rolling drum 17, while adding water 3, to produce the granulates 1.

The rolling drum 17 can rotate about a rolling drum axis 18, said rolling drum axis 18 being horizontally oriented. The intensive mixer 5, the granulator 11, the rolling drum 17 and the conveyor belts 10, 16 comprise dispensers for the purpose of adding the raw materials 2, water 3 and the admixtures 6. After the raw granulates 12 have been rolled and/or coated in the rolling drum 17 to produce the granulates 1, these are introduced into a sintering plant 19.

In summary, the invention relates to a method for manufacturing granulates 1, said method comprising steps as follows:
in a first method step, intensively mixing raw materials 2, in particular iron ore, fine iron ore concentrates, coke breeze, limestone and if applicable admixtures 6, in particular sinter returns, binding agents, dust and/or residual steelworking materials, while adding water 3, to produce a mixture 4 in an intensive mixer 5,
in a second method step, introducing the mixture 4 and if applicable admixtures 6 into a granulator 11 and granulating the mixture 4, while adding water 3, to produce raw granulates 12,
in a third method step, introducing the raw granulates 12, water 3, and if applicable admixtures 6 and coke fines, into a rolling drum 17 and rolling and if applicable coating the raw granulates 12 with calcium oxide and/or calcium hydroxide and/or the coke fines to produce the granulates.

The granulates 1 according to the invention are used in the sintering plant 19. In this case, the granulates 1 are introduced into the sintering plant 19 as a raw sintering mixture in the form of a layer. In comparison with granulates manufactured according to the prior art, the layer consisting of the granulates 1 according to the invention has a more homogenous grain size distribution and therefore higher permeability. As a consequence, the productivity of the sintering process is increased, thereby allowing various components of the sintering plant 19 to be scaled down. In contrast with the prior art, the method according to the invention also allows the efficient processing of raw materials 2 in the form of fine particles.

Although the invention has been illustrated and described in detail with reference to the preferred exemplary embodiment, the invention is not restricted to the example disclosed herein and other variations can be derived therefrom by a person skilled in the art without thereby departing from the scope of the invention.

LIST OF REFERENCE SIGNS

1 Granulates
2 Raw materials
3 Water
4 Mixture
5 Intensive mixer
6 Admixtures
7 Mixing drum
8 Mixing drum shaft
9 Mixing tools
10 First conveyor belt
11 Granulator
12 Raw granulates
13 Granulator drum
14 Granulator drum shaft
15 Granulating tools
16 Second conveyor belt
17 Rolling drum
18 Rolling drum axis
19 Sintering plant
20 Granulator drum axis
21 Mixing drum axis

The invention claimed is:

1. A device for manufacturing granulates, wherein the device comprises:
an intensive mixer configured for intensively mixing iron ore and/or fine iron ore concentrates and other raw materials and added water for producing a mixture, said intensive mixer being provided with a water inlet for introducing said added water into the intensive mixer;
a granulator is operationally connected to the intensive mixer, and configured for receiving and for granulating the mixture and admixtures, while adding water, for producing raw granulates, said granulator being provided with a water inlet for introducing said added water into the granulator; and
a rolling drum, operationally connected to the granulator, for receiving the mixture and admixtures for rolling the raw granulates to produce granulates, said rolling drum being provided with a water inlet for introducing water into the rolling drum.

2. The device as claimed in claim 1, further comprising the intensive mixer comprises:
a mixing drum having a mixing drum axis and at least one rotatable mixing drum shaft;
mixing tools fixed to the mixing drum shaft and so oriented as to be perpendicular to the mixing drum axis or to the mixing drum shaft, wherein the mixing drum axis and the mixing drum shaft are vertically or horizontally oriented in the normal operating state of the intensive mixer.

3. The device as claimed in claim 1, further comprising the granulator comprises:
a granulator drum having a granulator drum axis and at least one rotatable granulator drum shaft;
granulating tools fixed to the granulator drum shaft, and the granulating tools are oriented perpendicular to the granulator drum axis or to the granulator drum shaft, the granulator drum axis and the granulator drum shaft being one of vertically or horizontally oriented in a normal operating state of the granulator.

4. The device as claimed in claim 1, further comprising the rolling drum is rotatable about a rolling drum axis and the rolling drum axis is horizontally oriented in the normal operating state of the rolling drum.

5. The device as claimed in claim 1, further comprising the intensive mixer has a tool Froude number of at least 7.

6. The device as claimed in claim 1, further comprising the granulator has a tool Froude number of at least 1.

7. The device as claimed in claim 1, wherein the raw materials comprise coke breeze and limestone, the optional admixture comprises sinter returns, binding agents, dust and/or residual steelworking materials; and the rolling drum is configured for coating the raw granulates with calcium oxide and/or calcium hydroxide and/or coke fines.

\* \* \* \* \*